Patented July 22, 1947

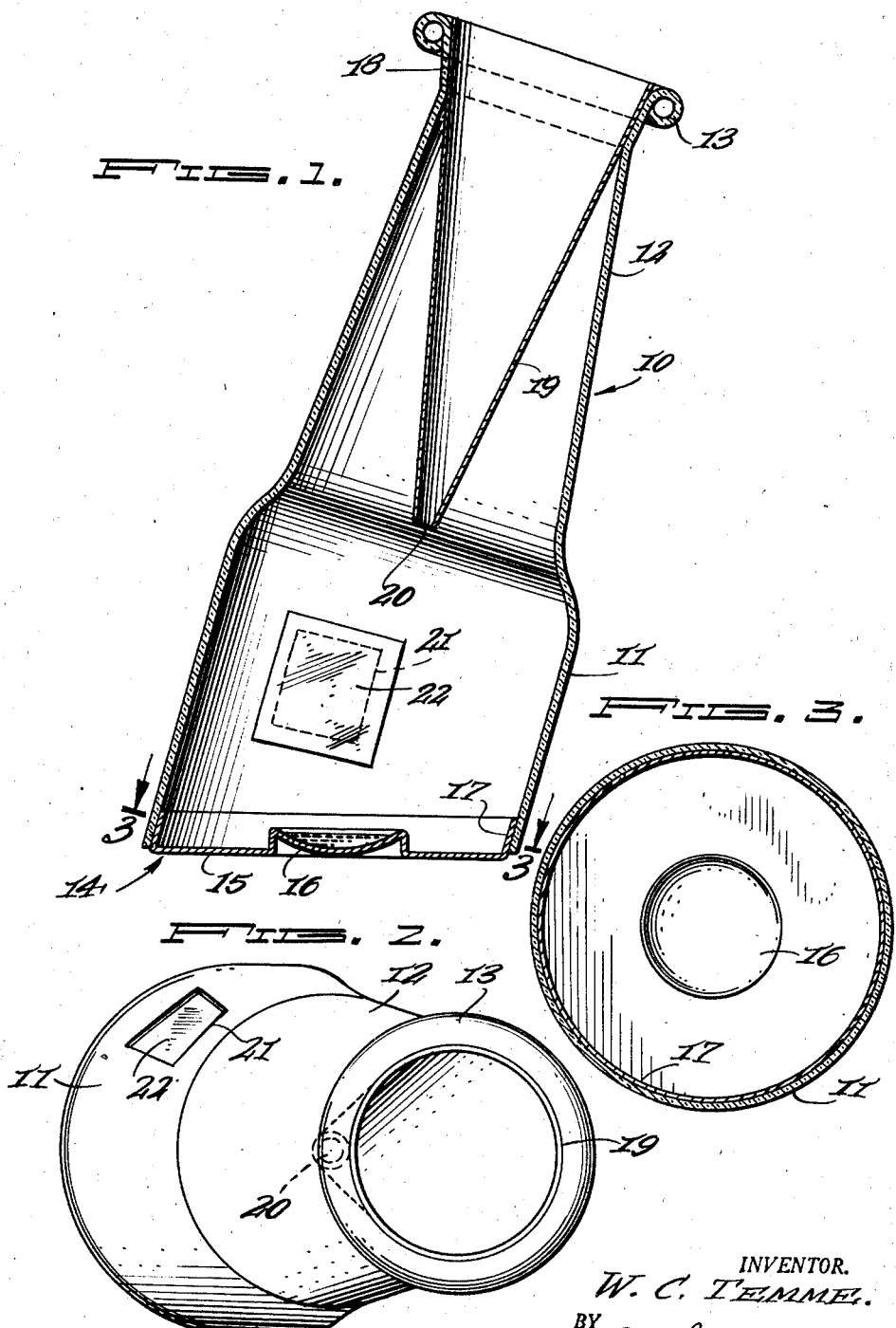

2,424,421

UNITED STATES PATENT OFFICE 2,424,421

INSECT TRAP

William C. Temme, South Amboy, N. J.

Application November 24, 1945, Serial No. 630,621

3 Claims. (Cl. 43—121)

This invention relates to insect traps, and aims to provide a useful and efficient trap for vermin, particularly water bugs or cockroaches in the home, in hotels, in ships, etc.

The above broad as well as additional and more specific objects will become apparent in the following description, wherein characters of reference refer to like-numbered parts on the accompanying drawing. It is to be noted that the drawing is intended to serve the purpose of illustration only, and that it is therefore neither desired nor intended to limit the invention necessarily to the specific details of construction shown excepting insofar as such details may be deemed essential to the invention.

Referring briefly to the drawing,

Fig. 1 is a longitudinal sectional elevational view of the trap.

Fig. 2 is a plan view of the trap.

Fig. 3 is a cross-sectional view taken on the line 3—3 of Fig. 1.

Referring in detail to the drawing, the numeral 10 indicates the hollow body of the trap, which may be termed "leaning," and comprises a relatively wide substantially cylindrical lower portion and a relatively narrower substantially conical upper portion, shown at 11 and 12, respectively.

The body 10 is open at both the top and bottom, and a separate and insertable bottom 14 is provided to form a bottom closure. This comprises a disc-like member 15 having a raised cup or receptacle 16 formed therein with the open top of the cup provided on the top of the closure 14. A "leaning" flange 17 is provided on the disc 15 and is adapted to be inserted frictionally and similarly retained therein, into the lower periphery of the body portion 11.

Near the upper end of the body portion 12, the body is deformed to provide an outwardly tapering upward projection 18, and the upper periphery thereof may be rolled or otherwise stiffened as shown at 13.

A hollow cone 19 tapering at substantially the same angle as the projecting wall 18, is adapted to be inserted in the manner illustrated into the open top of the body 10 and to come to rest in the position shown with its uppermost peripheral edge registering on the inner surface of the projection 18 which thereby provides both a limit stop and a seat for the cone 19. The latter has a reduced opening 20 at its lower end.

The entire trap, comprising the body 10, the bottom closure 14, and the cone 19 may be made of any suitable material, but paper or cardboard would probably be preferable for the purpose, and the cone 19 may also preferably be made of a waxed or smooth paper.

In use, before applying the closure 14 to the bottom of the body 10, a bait of any kind but preferably one which gives off a sweet odor, is placed in the cup 16, and then the closure 15 is inserted to register in the body as shown. The trap is then set against a wall on the floor or in a closet where the insects are prevalent, or in a corner intersection of two walls.

The only access into the trap by the insects is through the open top of the cone 19, from which the odor of the bait emanates, and into which the insects are lured. Owing to the leaning of the trap against the wall, the insects have a direct passage from the wall into the cone. When they enter onto the cone they will either walk down it and through the opening 20, or, if the surface of the cone is sufficiently smooth, will slide down it through the opening 20. Once they reach the bottom of the trap, they will obviously be unable to escape through the only possible escape passage, that is, through the cone opening 20.

If the three members 10, 14, and 19 are all made of paper, as above-mentioned, the entire trap, when it has trapped a sufficient number of insects, may be thrown into a fire and burned. In order to be able to ascertain whether a sufficient number of insects has been trapped, a window 21 of any transparent paper-like material such as, for instance, Cellophane, may be provided to cover an opening 22 through the wall of the lower portion 11 of the body 10.

Obviously, modifications in form and structure may be made without departing from the spirit and scope of the invention.

I claim:

1. An insect trap comprising an elongated hollow tube-like body open at the top and bottom, the plane of the bottom peripheral edge of said body lying at other than a right angle with respect to the axis of the body thereby causing said body to lean when set upon a horizontal surface, a disc like closure having means for securing the same to said bottom peripheral edge, and a hollow cone open at both ends, the wider end of said cone being of greater diameter than the least diameter of said body, said cone being positioned in said body with the narrower end downward and the upper end registering in and being seated within said least diameter of the body.

2. The trap set forth in claim 1, the upper end of said body having an outwardly tapering conical projection thereon, said least diameter of said body occurring at the intersection of said projection with the adjacent portion of said body.

3. The trap set forth in claim 1, the upper end of said body having an outwardly tapering conical projection thereon, said least diameter of said body occurring at the intersection of said projection with the adjacent portion of said body, the conformation of said projection being substantially identical to the conformation of the cone adjacent the wider end of the cone, said projection thereby providing a seat for said cone.

WILLIAM C. TEMME.

REFERENCES CITED

The following references are of record in the file of this patent:

UNITED STATES PATENTS

| Number | Name | Date |
|---|---|---|
| 119,435 | Webb | Sept. 26, 1871 |
| 1,460,596 | Martin | July 3, 1923 |
| 1,701,498 | Hickman | Feb. 12, 1929 |
| 1,085,329 | Gabel | Jan. 27, 1914 |
| 1,549,858 | Evans | Aug. 18, 1925 |